(12) United States Patent
Kawai

(10) Patent No.: US 6,862,107 B1
(45) Date of Patent: Mar. 1, 2005

(54) IMAGE FORMING APPARATUS

(75) Inventor: Atsushi Kawai, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 772 days.

(21) Appl. No.: 09/604,005

(22) Filed: Jun. 26, 2000

(30) Foreign Application Priority Data

Jun. 30, 1999 (JP) .......................................... 11-185879

(51) Int. Cl.[7] .............................................. G06F 15/00
(52) U.S. Cl. .................... 358/1.18; 358/501; 358/448; 358/296; 399/6; 399/194; 399/182
(58) Field of Search ................................ 358/1.18, 1.9, 358/1.2, 501, 448, 296, 314; 399/6, 194, 182; 382/100, 237

(56) References Cited

U.S. PATENT DOCUMENTS 6,526,155 B1 * 2/2003 Wang et al. ................. 382/100
6,535,616 B1 * 3/2003 Hayashi et al. ............. 382/100

FOREIGN PATENT DOCUMENTS

| JP | 6-268840 | 9/1994 |
|----|----------|--------|
| JP | 8-256256 | 10/1996 |
| JP | 9-69935 | 3/1997 |

\* cited by examiner

*Primary Examiner*—Twyler M. Lamb
(74) *Attorney, Agent, or Firm*—McDermott Will & Emery LLP

(57) ABSTRACT

Image forming apparatus is equipped with a memory for storing additional images and an area discriminating unit for discriminating areas included in document images. The area discriminating unit discriminates text areas included in a document image based on the cyclicity of the density distribution of the document image. An additional image stored in the memory is synthesized into a discriminated text area. On the other hand, no additional image is synthesized into graphic areas and photograph areas. Images obtained as a result of the syntheses of document images and additional images are printed out on paper.

9 Claims, 10 Drawing Sheets

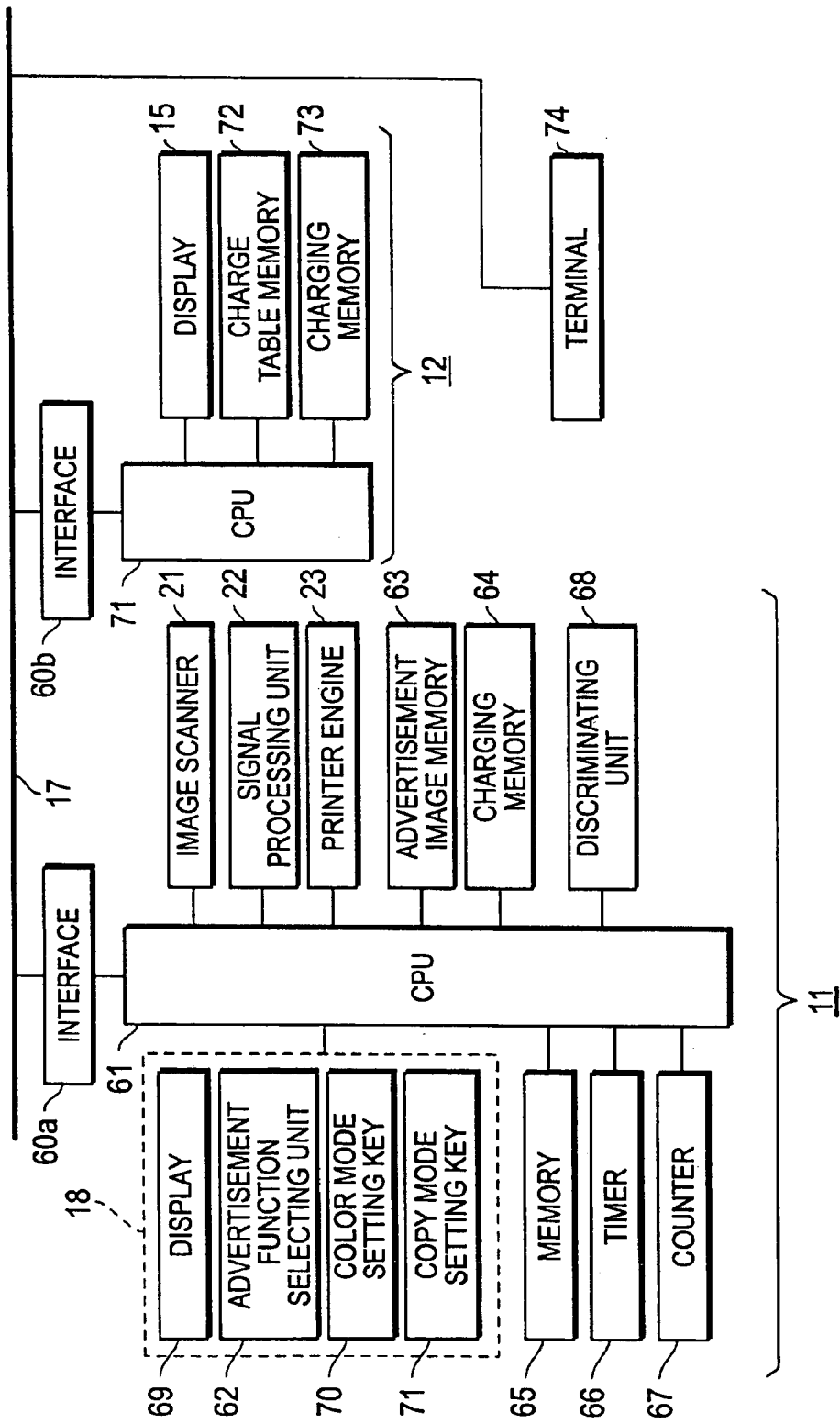

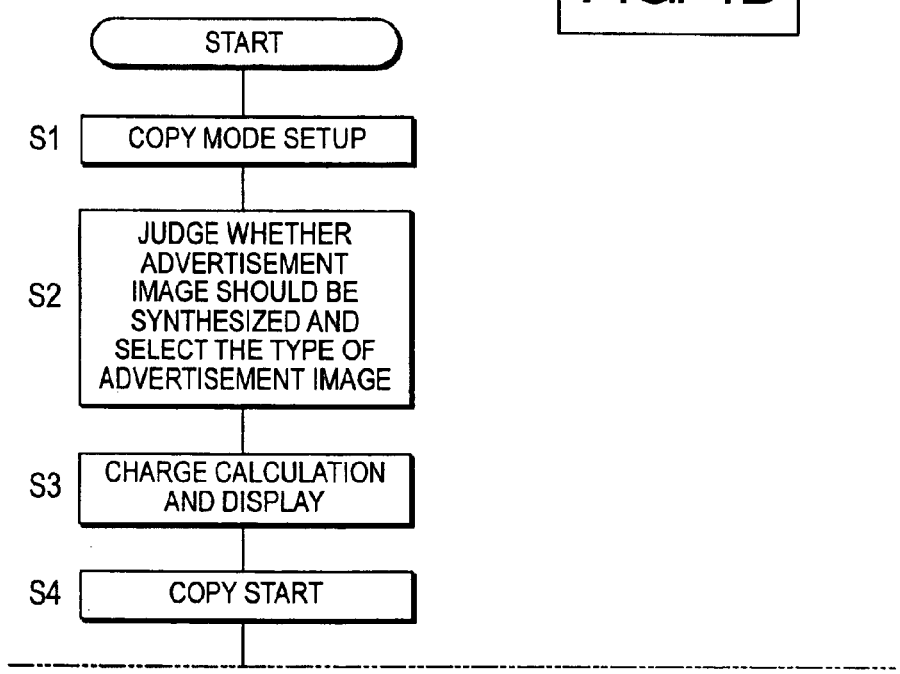

DENSITY DISTRIBUTIONS ALONG THE LINE "b"

DENSITY DISTRIBUTIONS ALONG THE LINE "b"

ADVERTISEMENT IMAGE

IMAGE FORMING APPARATUS

This application is based on Japanese Patent Application No. 11-185879 filed on Jun. 30, 1999, the contents of which are hereby incorporated by reference.

BACKGROUND OF THE INVENTION

1. Field of the Invention

The invention relates to an apparatus for synthesizing additional images that are stored to document images.

2. Description of Related Art

Coin-operated copying machines have become quite popular in convenience stores and other similar stores these days. Unspecified users operate these machines. Therefore, it is possible to achieve a substantial advertisement effect if additional images such as advertisement images can be added to the intended document images produced by scanning documents when the users make copies using these machines.

Therefore, a technology has been proposed to print document images with added images.

For example, the Japanese Unexamined Patent Publication No. 8-256256 discloses a technology for adding advertisement images to vacant areas of the document image. The disclosed technology provides the following process. A vacant area is detected from the document image obtained by the copying machine as it scans the document. The information concerning the detected vacant area is transmitted to the server via a network. An advertisement image that is suitable for the detected vacant area is selected from the advertisement images stored in the server. The selected image is transmitted to the image forming device. As the advertisement image is added to the vacant area, both the document image and the advertisement image are printed.

The Japanese Unexamined Patent Publication No. 6-268840 displays another technology for synthesizing the two images. According to this technology, the density of the image stored in the memory is compared with the density of the document image pixel by pixel. If the density data of the document image turns out to be higher than the prescribed value, the document image data is selected, while if it is lower, the stored image is selected. Therefore, when the stored image is synthesized with the document image according to the technology, the synthesis causes one image to appear as if it is watermarked against the other image.

Furthermore, the Japanese Unexamined Patent Publication No. 9-69935 discloses a technology for adjusting the density of at least one of the images so that it is easier to differentiate the images when two images are synthesized.

However, the copying machine disclosed by the above-mentioned Publication of Unexamined Patent Application No. 8-256256 has a shortcoming that the advertisement effect is small when the vacant area is small as only a relatively small advertisement image can be printed because the advertisement image is printed only in the vacant area of the document image. Also, it does not allow to print any advertisement image if there is no vacant space in the document image.

When the image synthesis technologies disclosed by the above-mentioned Japanese Unexamined Patent Publication No. 6-268840 and No. 9-69935 are applied to the synthesis of the advertisement image on the document image, the advertisement image appears as if it is watermarked or appears weak, so that the advertisements are difficult to see. When the document image happens to be a photograph image or a graphic image, the advertisement image that appears like a watermark or printed weakly over the document image makes it difficult to see the document image. Thus, a user who is concerned about making the document difficult to see may not wish to synthesize the advertisement image. On the other hand, the advertiser may not like to print the advertisement like a watermarked or weak image as it reduces the advertisement effect.

SUMMARY OF THE INVENTION

It is an object of this invention to provide an image forming apparatus that is capable of synthesizing an additional image in a text area contained in the document image, so that a larger additional image can be synthesized and printed out, and simultaneously preventing the chance of the document image from becoming unidentifiable due to the synthesis of the advertisement image.

According to an aspect of the invention, the image forming apparatus comprises an interface for receiving image data, a memory for storing additional images, a text area discriminating unit for discriminating text areas based on image data received at the interface, an image synthesizing unit for synthesizing additional images stored in the memory into the text areas discriminated by the text area discriminating unit, and a printer engine for forming the synthesized images synthesized by the image synthesizing unit.

This present invention provides a means of identifying the text area based on the document image and synthesizing an additional image in the identified text area, it is possible to synthesize a larger additional image compared to a case where an additional image is synthesized only in a vacant area, thus increasing the advertisement effect when using the additional image for an advertisement purpose and preventing the document image from becoming unidentifiable as a result of the synthesis of the additional image.

BRIEF DESCRIPTION OF THE DRAWINGS

FIG. 3 is a block diagram of the image forming system shown in FIG. 1.

FIG. 4A is a flow chart showing the procedure of the copying operation according to the coping machine shown in FIG. 2.

DESCRIPTION OF THE PREFERRED EMBODIMENT

Figure 1:
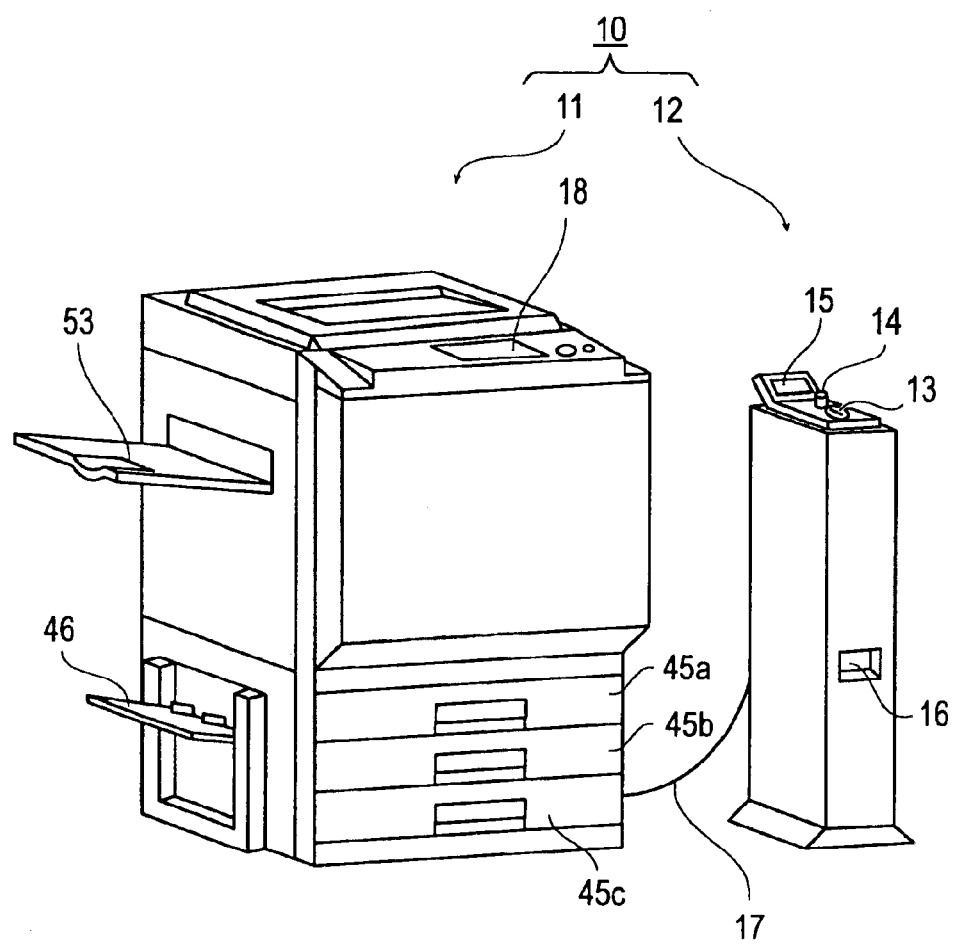
FIG. 1 is a perspective view of the image forming system to which the present invention is applied.

FIG. 1 is a perspective view showing the entire structure of the image forming system according to this invention. As shown in FIG. 1, an image forming system 10 is equipped with a copying machine 11 and a charging device 12 for the user.

The charging device 12 is essentially a coin-operated vending machine consisting of a coin depositing slot 13, a coin return button 14, a display 15 and a coin return slot 16. The user deposits coins into the coin depositing slot 13 of the charging device 12 and directs the copying machine 11 to conduct the copying operation. The charging device 12 displays the deposited amount to the user, and allows the copying machine 11 to conduct the copying operation depending on the deposited amount. Moreover, when the copying operation is conducted, the charging device 12 collects the prescribed amount of money and displays anew the amount after the collection, i.e., the remaining amount. The amount to be collected is determined according to the paper size used or the color mode specified. The charging device 12 prohibits the copying operation of the copying machine 11 when the remaining amount as a result of the fee collection after the copying operation becomes less than the amount necessary to conduct the copying operation. When an additional amount required is deposited, it allows the copying machine 11 to conduct the copying operation again. Thus, the charging device 12 performs the function of allowing or disallowing the copying machine 11 to conduct the copying operation controlling the usage fee and the remaining amount.

The copying machine 11 maintains communication with the charging device 12 via a connecting line 17. The copying machine 11 transmits to the charging device 12 a signal to inform that the copying operation is in process, a paper feed signal that the paper feeding is completed, a paper discharge signal that the paper discharge is completed, a signal to inform the size of the paper to be used, a signal to inform the copy mode to be set up, etc. On the other hand, the charging device 12 transmits to the copying machine 11 a signal that indicates whether copying is allowed or not allowed, and a signal that indicates the deposited amount. The copying machine 11 is enabled or disabled to copy depending on the signals allowing or disallowing the copying action. On the top surface of the copying machine 11 is provided an operating panel 18 for the user to set up the copying mode, etc.

Although the embodiment shown in FIG. 1 is described as having a charging device like a coin-operated vending machine, the invention is not limited to it but it can rather have a charging device that controls the fee by means of a memory medium such as a prepaid card where the monetary information is stored.

Figure 2:
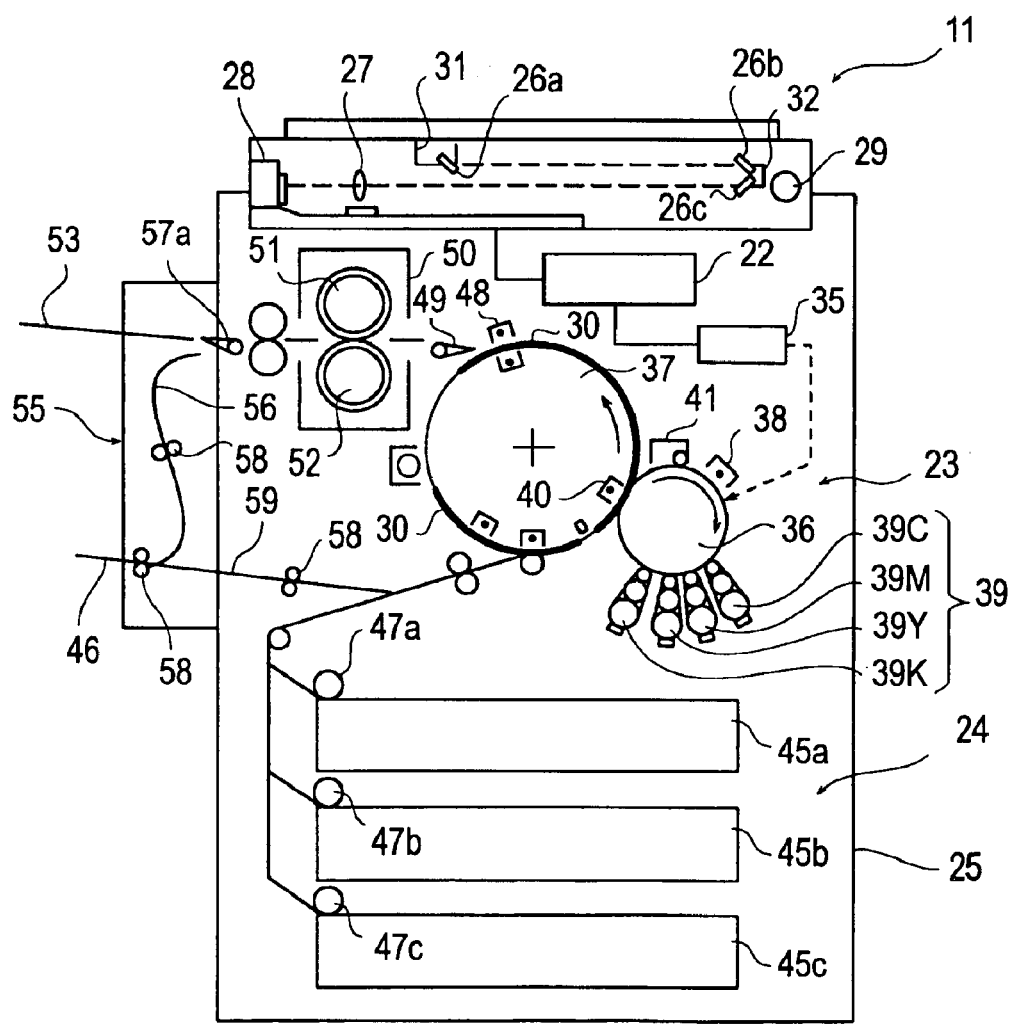
FIG. 2 is a schematic drawing showing the internal structure of a copying machine according to an embodiment of the present invention.

FIG. 2 is a schematic drawing showing the internal structure of the copying machine shown in FIG. 1.

The copying machine 11 shown in FIG. 2 is a four-cycle full-color copying machine. The copying machine 11 includes an image scanner 21, a signal-processing unit 22, a printer engine 23, a paper storage unit 24, and a casing 25 that contains all of these.

The image scanner 21 scans the document. The signal-processing unit 22 generates a document image by processing the signals obtained by the image scanner 21. The printer engine 23 prints out on printing paper based on the generated document image or the advertisement image synthesized with the document image. The paper storage unit 24 stores the printing paper.

The image scanner 21 irradiates with the light from a lamp the document laid on a platen glass. The light reflected from the document is collected on a line sensor (consisting of CCD) 28 via multiple mirrors 26a, 26b and 26c and a condenser lens 27. A scanner motor 29 drives a first scanner head 31 at a speed V and a second scanner head 32 at a speed V/2. The first scanner head 31 and the second scanner head 32 both move in a direction (vertical scanning direction) perpendicular to the electrical scanning direction (horizontal scanning direction) of the line sensor 28 to scan the document surface.

The signal processing unit 22 functions as an internal interface that receives the image signal (image data) obtained by scanning the document by the line sensor 28.

The printer engine 23 is equipped with a laser generator 35, a photoconductor drum 36 that is driven rotationally in a direction shown by an arrow in the drawing, and a transfer drum 37 on the circumference of which a sheet of paper 30 is adhered to. An electrostatic charger 38, a developing device 39 (integration of developers 39C, 39M, 39Y and 39K), a transfer charger 40, and a cleaning device 41 are arranged on the periphery of the photoconductor drum 36.

The electrostatic charger 38 charges the photoconductor drum 36 evenly.

The developing device 39 develops the electrostatic latent images formed on the photoconductor drum 36. The developing device 39C contains a cyan (C) toner; similarly, the developing devices 39M, 39Y and 39K contain respectively a magenta (M) toner, an yellow (Y) toner and a black (K) toner respectively.

The transfer charger 40 transfers the developed toner image on the paper 30.

The cleaning device 41 removes the toner remaining on the photoconductor drum 36.

The laser generator 35 drives and modulates a semiconductor laser depending on the level of the image signal transmitted by the signal-processing unit 22. The laser light is irradiated on the photoconductor drum 36 via a polygon mirror, an f-θ lens and a reversing mirror, which are not shown here, causing an electrostatic latent image to be formed on the photoconductor drum 36, which in turn is developed on the developing device 39.

The paper storage device 24 is provided with multiple (three in case of an example shown here) paper-feeding cassettes 45a, 45b and 45c. Each of these paper-feeding cassettes 45a, 45b and 45c contains paper of a different size or orientation. The copying machine 11 includes a manual feed tray 46 for manually feeding the printing paper. The paper stored in these cassettes 45a, 45b and 45c is fed sheet by sheet with the help of the paper feed rollers 47a, 47b and 47c. The sheet of paper thus fed is then electrostatically adhered to the circumference of the transfer drum 37. When the paper set in the manual feed tray is used, the paper laid on the manual feed tray 46 is fed.

An image developed on the photoconductor drum 36 is then transferred to a sheet of paper 30 that is adhered to the transfer drum 37. If the copying mode is monochromatic copying, the recording process consisting of image forming, development and transfer is conducted for the black (K) toner to form a monochromatic image. If the copying mode is full-color copying, the recording process consisting of image forming, development and transfer is conducted for each toner. In other words, the basic color images of cyan (C), magenta (M), yellow (Y), and black (K) are overlaid on top of each other to form a full-color image on the paper 30. It is also possible to conduct a mono-color printing using only one of cyan (C), magenta (M), and yellow (Y). In case of a mono-color printing, the recording process is conducted only once as in a case of printing with black (K) only.

The sheet of paper after the image forming is separated from the transfer drum 37 by means of a separating charger 48 and a separating claw 49. The separated sheet is then transferred to a fixing device 50. The fixing device 50 consists of a fixing roller 51 that contains a heater such as a halogen heater, and a pressing roller 52 that presses the fixing roller 51 across the sheet of paper. The fixing device 50 fixes a permanent image by heating and melting the toner transferred onto the sheet of paper. After the toner is fixed, the sheet of paper is discharged to a discharge tray 53.

The copying machine 11 is capable of double-side copying. Consequently, it is equipped with a paper turnover mechanism 55 that turns over a sheet of paper which is printed with an image.

The paper turnover mechanism 55 is equipped with a turnover passage 56, a switching claw 57, multiple transporting rollers 58, and a paper transporting passage 59 that is connected to the manual feed tray 46. The turnover passage 56 is a passage through which the sheet of paper from the fixing device 50 is transported in case of double-side copying. The switching claw 57 is switched selectively to direct the sheet of paper either to the discharge tray 53 or to the turnover passage 56.

A sheet of paper transported to the turnover passage 56 is turned over upside down, i.e., the first side which has been printed becomes the bottom side, while the second side which has not been printed becomes the top side, before it is adhered again to the transfer drum 37.

FIG. 3 is block diagram of the control system of the image forming system 10.

The copying machine 11 and the charging device 12 are interconnected enabling to communicate with each other via a connecting line 17 and input/output interfaces 60a and 60b. A CPU 61 of the copying machine 11 is connected to the image scanner 21, the signal processing unit 22, and the printer engine 23.

The CPU 61 is connected to an operating panel 18. The operating panel 18 contains an advertisement function-selecting unit 62. The CPU 61 is connected with an advertisement image memory 63, a charging memory 64, a working memory 65, a timer 66, a counter 67 and a discriminating unit 68.

The advertisement image memory 63 is a memory intended for storing in advance multiple advertisement images. The charging memory 64 is for storing fees to be charged to the advertiser in correspondence with the number of prints produced with synthesized advertisement images. The working memory 65 is used for temporarily storing image data or image synthesizing. The timer 66 measures the current time. The counter 67 counts the total number of prints made with synthesized advertisement images. The discriminating unit 68 discriminates whether an advertisement image and/or document image should be printed in color or monochromatically.

The CPU 61 is in charge of controlling various parts of the copying machine 11 and communication control between it and the charging device 12. The CPU 61 functions as a text area discriminating unit for identifying a text area based on the image data as described later, an image synthesizing unit for synthesizing an advertisement image stored in the advertisement image memory 63 with the text area, and a color discriminating unit for discriminating the text color in the text area. The advertisement image memory 63 functions as the memory for storing the added image.

The charging memory 64 stores the cumulative fee for the advertiser. A claimed amount is calculated for an advertiser for a given period based on the contents of the charging memory 64. Thus, a claimed amount for each specified period will be claimed in a lump sum to a specific advertiser. The operating panel 18 has a numeric pad of ten keys for setting up the number of copies to be made, etc., a key 70 for selecting either a color or monochromatic copy of the document image, a key 71 for selecting a desired copying mode including the selection of double-side copying, enlarged or reduced size copying, etc., a start key for starting the copying action, and a display 69 for displaying the setup condition of the copying machine 11.

The display 69 can display a list of all advertisement images that can be synthesized with document images. The operating panel 18 is provided with the advertisement function-selecting unit 62.

When the synthesis of an advertisement image is selected, the advertisement function-selecting unit 62 functions as a key for selecting the type of the advertisement image, e.g., the name of the manufacturer, which is the advertiser.

The display 69 displays various user-charging information. For example, when an advertisement image is synthesized, the user's charge is less than the usual copying charge. The display 69 displays such messages as "The fee per copy will be discounted (xxx) yen when the advertisement is synthesized," or "The total copying fee for this operation is discounted (yyy) yen as the advertisement is synthesized." In other words, it is preferable to display the discount per copy or the total discount for the particular copying job on the display 69. With the actual discount on the copying fee displayed on the display 69, the user is more likely to choose the advertisement synthesizing and printing, thus contributing to the more accelerated use of the printing with synthesized advertisement images.

On the other hand, the CPU 71 of the charging device 12 is connected with the display 15. Moreover, the CPU 71 is connected with a charge table memory 72, and a charging memory 73 for storing the number of copies and the charges to the users among others. The CPU 71 is in charge of controlling various parts of the charging device 12 and controlling the communication between it and the copying machine 11.

The charge table memory 72 stores the standard charges for the user and the advertiser respectively. The standard for the copying charge is set up based upon the copying productivity such as the increase in the user's waiting time for the finish of copying. For example, the standard for the copying charge is set according to the complexity of the contents of the advertisement image or the combination of the color mode of the document image and the color mode of the advertisement image.

The CPU 71 calculates the charges for the user and the advertiser respectively referencing the charge table memory 72 in accordance with the executed copying operation. The charges thus calculated are transmitted to the copying machine 10. The specific charges are calculated as follows.

As an example, if the user wishes to copy the document image in color as well as to synthesize the color advertisement image, the charge to the user is calculated as the normal color copying charge minus the advertisement fee. At the same time, the advertiser is charged with the advertisement fee.

If the user wishes to make a monochromatic copy of the document image as well as to synthesize the color advertisement image, the charge to the user is calculated as the normal monochromatic copying charge minus the advertisement fee. At the same time, the advertiser is charged with the normal color copying fee minus the amount charged to the user.

If the user wishes to make a monochromatic copy of the document image as well as to synthesize the monochromatic advertisement image, the user will be charged the normal monochromatic copy fee minus the advertisement fee and the advertiser will be charged an advertisement fee.

The charges thus calculated are stored in the charging memory 73 as mentioned before. The user's charge is compared with the amount deposited by the user, and the result is used for making a judgment whether the copying operation should be allowed or not. The charge to the advertiser will be finally stored in the charging memory 64 provided in the copying machine 11 to be accumulated in accordance with the number of copies made with synthesized advertisement images, and will be charged to the advertiser.

The image forming system 10 can be connected to a terminal 74 of a shop where the image forming system 10 is located. In such a case, it is also possible to arrange in such a way that a shop clerk can check the status of the copying machine 11, e.g., the number of remaining sheets of the printing paper or the remaining amount of the toner, the utilization status of the advertisement printing, the charges to the advertisers, etc., by operating the terminal 74. It is also possible to arrange in such a way as to allow a shop clerk to switch remotely the type of advertisement images that can be selected by users depending on the age and the difference of sexes.

Moreover, it is also possible to arrange to connect the image forming systems 10 installed in multiple stores to a terminal in the central control facility via a network. In this case, the control facility is capable of capturing the operating status of each image forming system 10 via the network, billing an advertiser by calculating the sum of the charges to the advertiser transmitted by individual image forming systems 10, or remotely replacing the advertisement images stored in the copying machine 11 at a certain interval.

The above-mentioned copying operation will be described in the following.

Figure 4B:
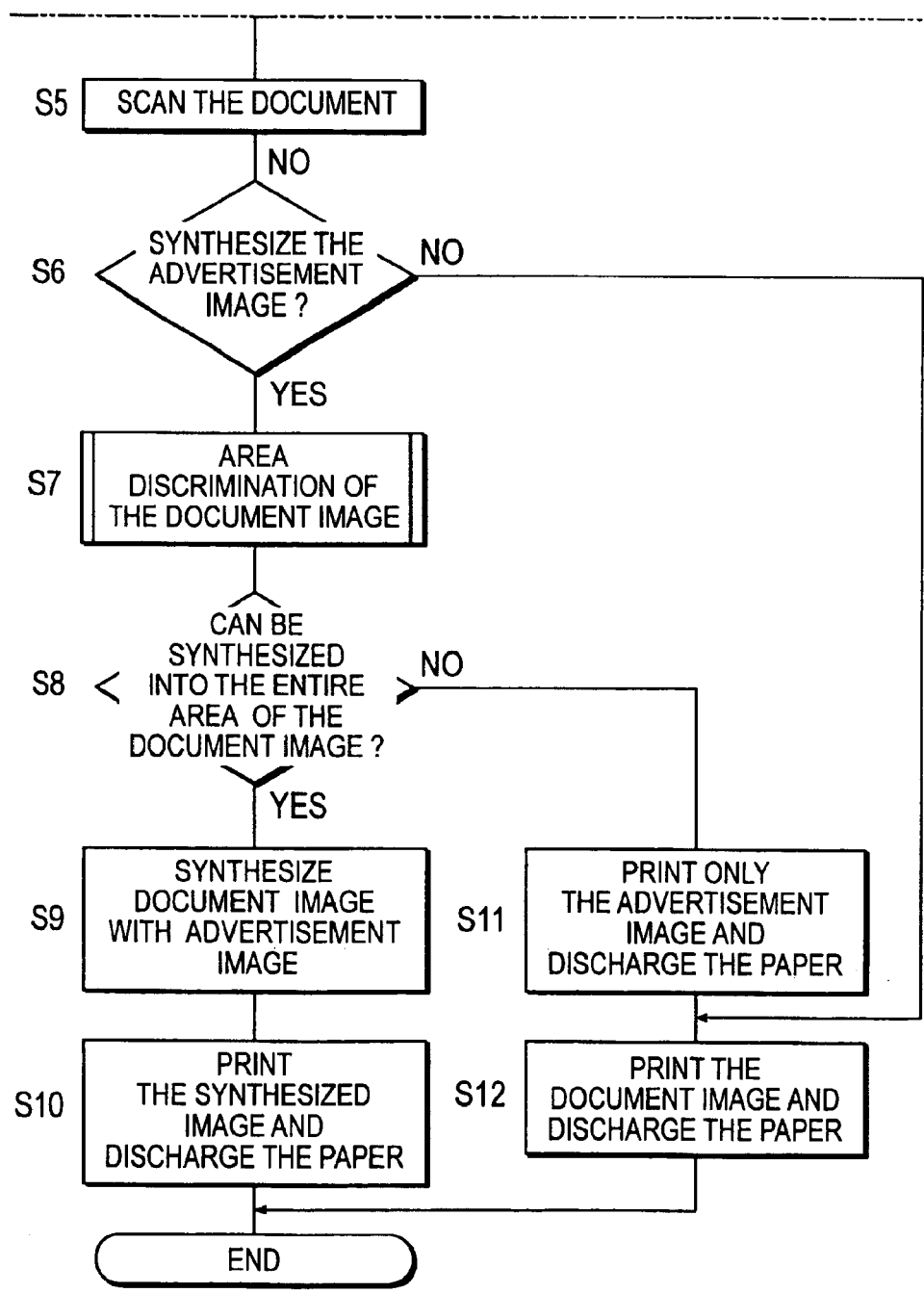
FIG. 4B is a flow chart following after that of FIG. 4A.

FIG. 4A and FIG. 4B are flow charts showing the procedure of the copying operation on the image forming system 10.

At the step S1 shown in FIG. 4A, a copy mode is set up by means of operating various keys on the operating panel 18. More specifically, copying modes, such as the selection of either color or monochromatic copying, either one-side or double-side copying, and the number of copies to be made, are set up. The information of the copying mode thus set up is stored in the memory 65.

At the step S2, the specifications for the advertisement image are selected. The specifications for the advertisement image (hereinafter called "advertisement specifications") include the specification whether to synthesize the advertisement image with the document image or not, the selection specifications such as to select the types of the advertisement images and the names of the manufactures, or the advertisers, etc. The contents of the advertisement specifications are stored in the memory 65.

At the step S3, the charge to the user is calculated based on the contents of the copying modes set up at the step S1 and the contents of the advertisement specifications set up at the step S2. The calculated charge amount is displayed on the display 69. More specifically, the information concerning the copying modes and the advertisement specifications is transmitted to the charging device 12 from the copying machine 11. The CPU 71 provided in the charging device 12 calculates the charge to the user based on the information about the copying modes and the synthesis (or no synthesis) of the advertisement image in accordance with the predetermined standard. The calculated charge amount is transmitted to the CPU 61 of the copying machine 11. The charge to the user, which is calculated by the charging device 12, is then displayed on the display 69 of the copying machine 11.

At the step S4, the approval notice for copying is received by the CPU 61, and the copying operation starts on the condition that the start key is pressed.

At the step S5 shown in FIG. 4B, the document is scanned. The document image obtained by scanning the document is stored in the memory 65.

At the step S6, the advertisement specifications stored in the memory are referenced to make a judgment whether there is a specification that the advertisement image be synthesized. As a result of the judgment, if it is specified not to synthesize the advertisement image, the process of the step S12, i.e., the normal printing process based on the document image obtained by scanning, is executed. If it is judged that there is a specification to synthesize the advertisement image, the process of the step S7 is executed.

At the step S7, discrimination of the areas of the document image is conducted. The details of the discrimination process for the document image will be discussed later.

At the step S8, if it is judged that it is possible to synthesize the advertisement image over the entire range of the document image, the process of the step S9 is executed. On the other hand, if it is judged that the advertisement image cannot be synthesized over the entire range of the document image, so that the process of the step S11 is executed.

At the step S9, the specified type of advertisement image is synthesized into the text area of the document image. The synthesis into the text area of the document image here can be performed in various methods. In this case, the synthesizing process is executed by adding the advertisement image data to the document image data.

At the step S10, the image produced by synthesizing the document image with the advertisement image is printed and the printed sheet is discharged.

At the steps S11 and S12, a special process is executed for a case, where the synthesis cannot be applied to the entire area of the document image, i.e., a whole page advertisement is not possible.

At the step S11, the advertisement image is printed as is without being synthesized with the document image. In other words, in a case where the advertisement image could not be synthesized due to the characteristics of the document image despite the fact that the user wanted a synthesis of the advertisement image, a process is executed to print the advertisement image on a separate sheet to achieve the desired advertisement effect.

At the step S12, the document image is printed.

Figure 5:
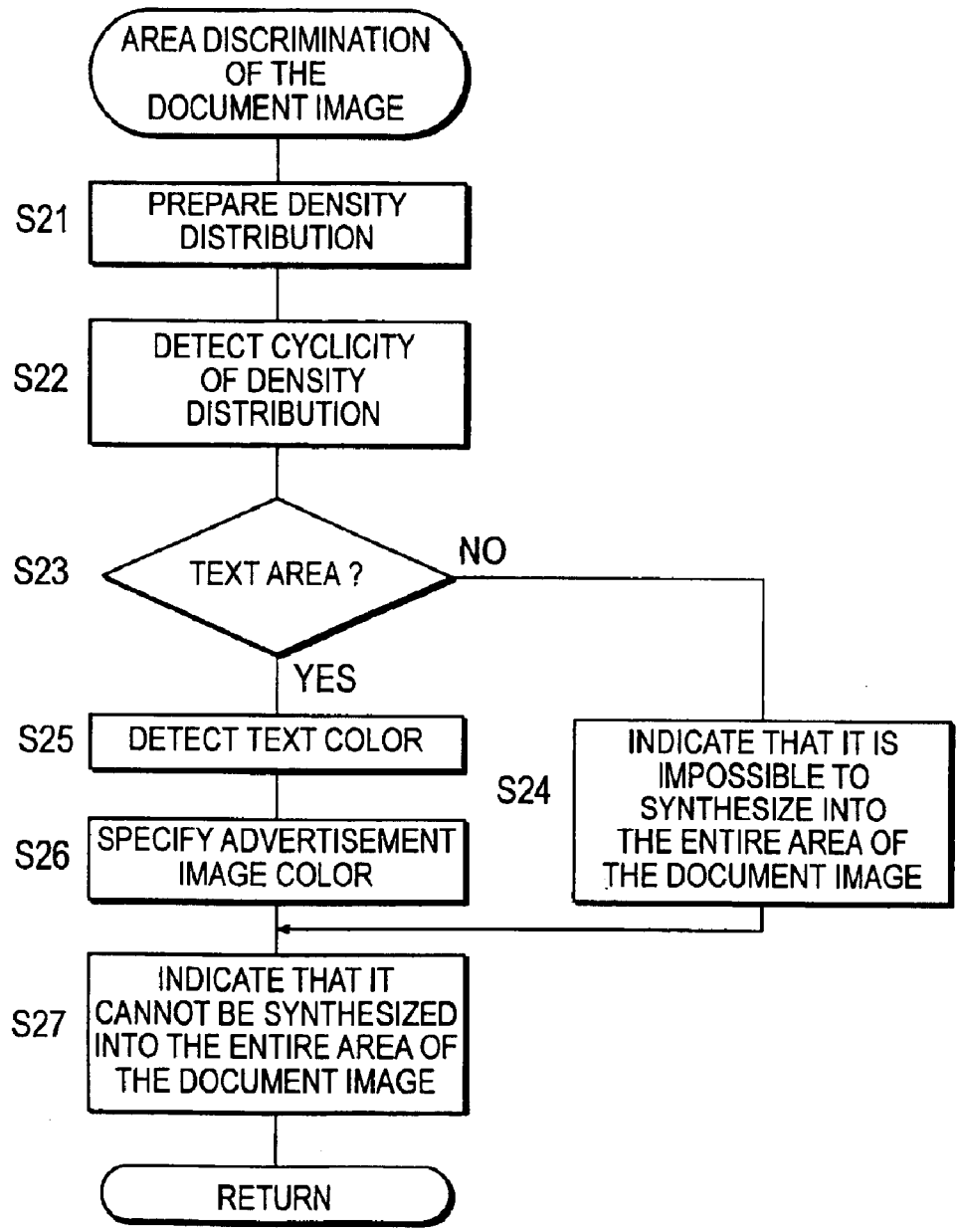
FIG. 5 is a flow chart showing the procedure of identifying an image area included in the flow chart shown in FIG. 4B.

However, it is not necessarily required to have a constitution to maintain the discount to the user's fee by printing the advertisement on a separate sheet of paper as shown in the steps S11 and S12 as described above. For example, it is possible to tell the user on the display that the fee discount on account of advertisement image synthesis cannot be offered and charge the user with the normal copying fee, if it is determined that the advertisement cannot be synthesized with the document image, FIG. 5 is a flow chart showing the discrimination procedure of the image area on the copying machine. FIG. 5 shows the process contents of the step S7 shown in FIG. 4B in more detail.

At the step S21, the CPU 61 prepares the density distributions of the document image along the horizontal scanning direction and the vertical scanning direction respectively.

At the step S22, the CPU 61 detects the cyclicity of the density distribution in each direction prepared in the above.

Figure 6:
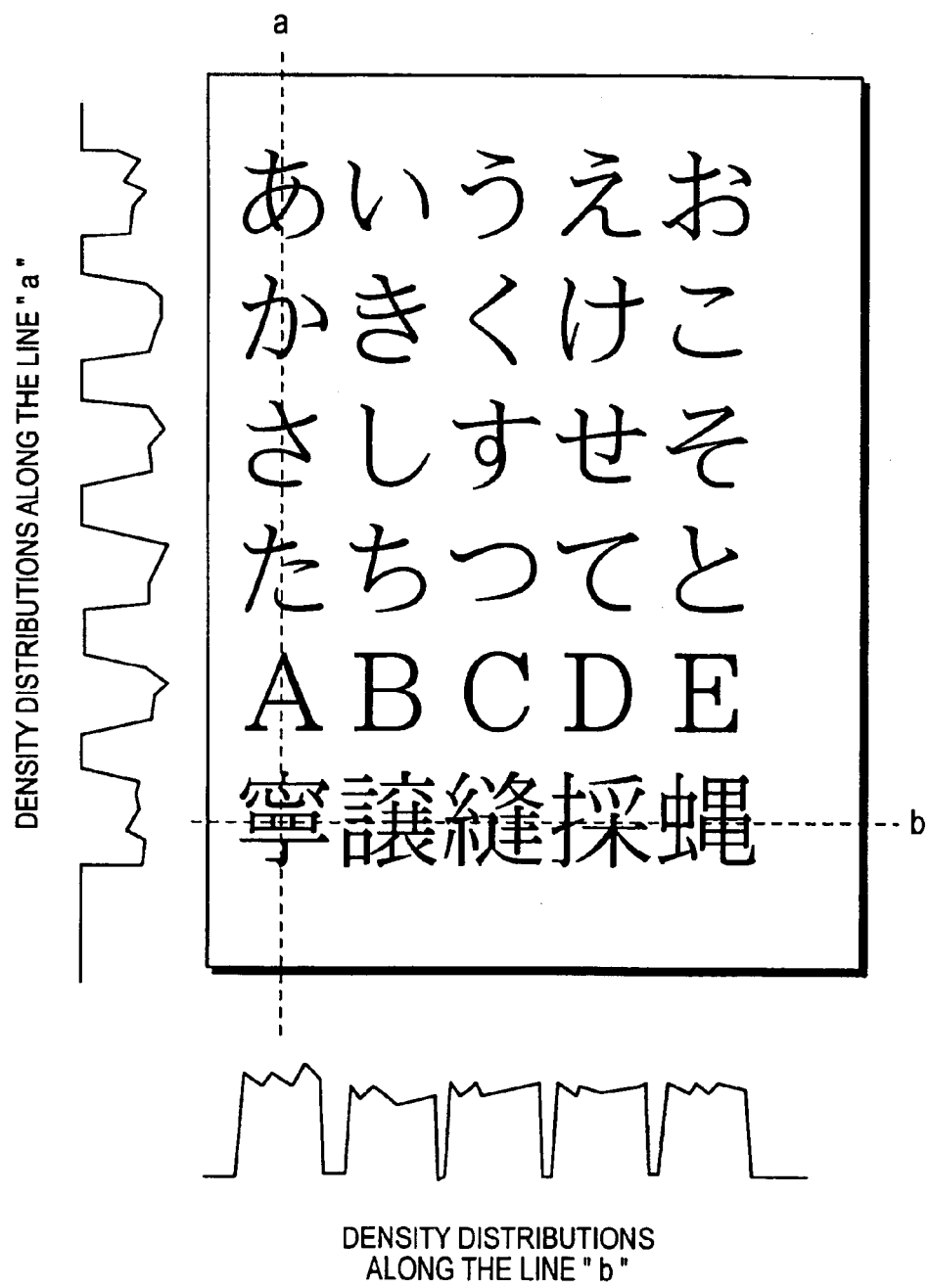
FIG. 6 is a diagram showing an example of density distribution within a text area.

FIG. 6 shows density distributions in the text area in a case where the text is written horizontally against the sheet. FIG. 6 also shows the density distributions along the line "a" (horizontal scanning direction) and the line "b" (vertical scanning direction) respectively. In particular the density distribution along the line "a" has a cyclicity as can be seen in FIG. 6. This cyclicity is due to the fact that the density distribution in the line "a" direction is higher due to the existence of characters and the density itself is almost zero between the text lines. The cyclicity of the density distribution can be detected only in a text area where texts are written horizontally against the sheet as shown, but also in a text area where texts are written vertically against the sheet.

Figure 7:
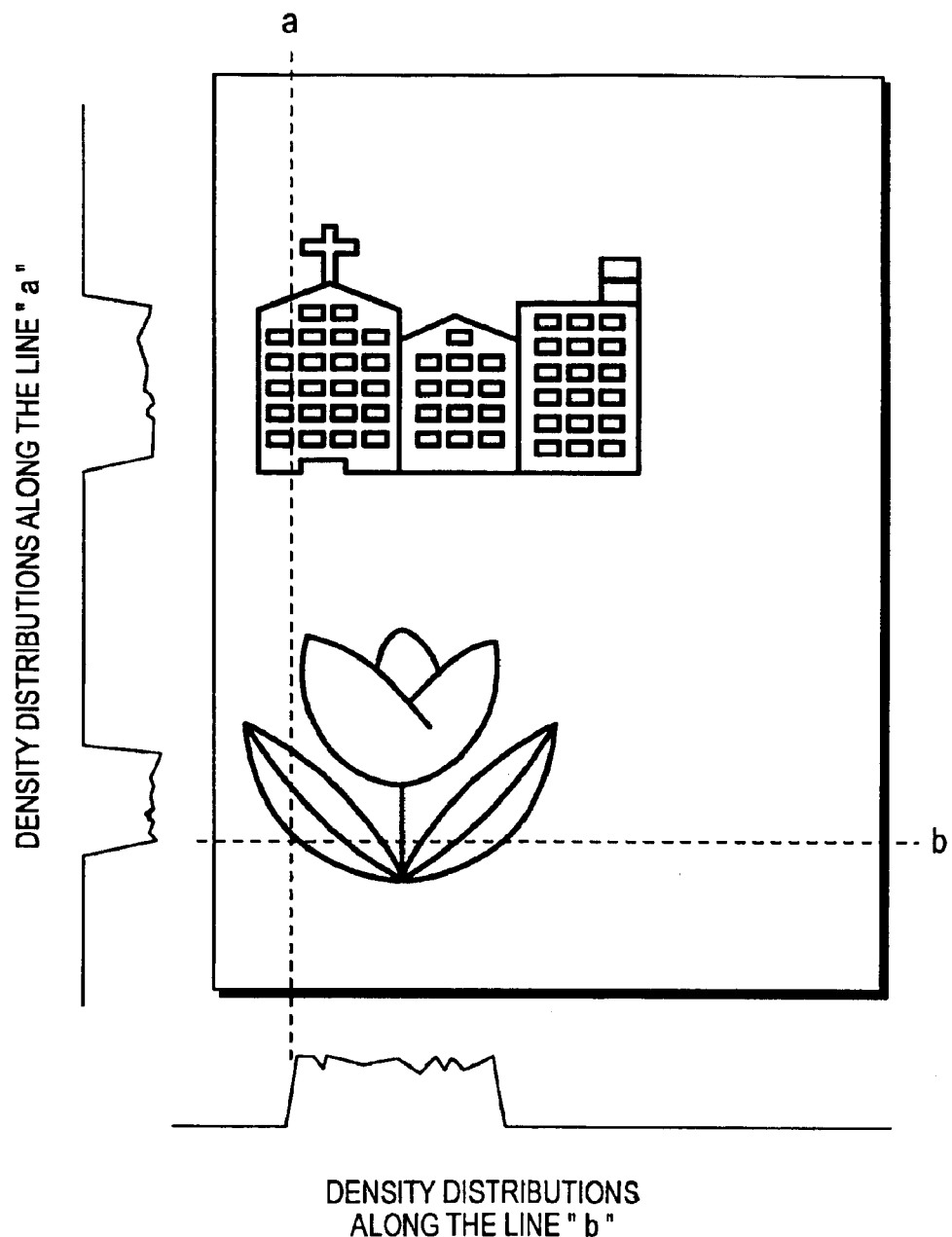
FIG. 7 is a diagram showing an example of density distribution within a non-text area.

FIG. 7 shows density distributions in a non-text area such as a photograph or a graphic image. As is obvious in FIG. 7, no cyclicity can be found in a non-text area.

Although FIG. 6 and FIG. 7 show cases where the density distribution is detected only along the line "a" and the line "b," the density distribution is detected along multiple lines in an actual case to detect text areas for the entire area of the document image. For example, in an actual image discrimination, density distributions can be detected along several tens to several hundreds of lines are prepared each for the horizontal scanning direction and the vertical scanning direction.

At the step S23 shown in FIG. 5, it is judged whether the entire area of a document image is a text area from the detection result of the cyclicity of the density distribution. If it is determined that not entire area of the document image is a text area, the process of the step S24 is applied, if the entire area of the document image is a text area, the process of the step S25 is applied.

At the step S24, it is determined that it is impossible to synthesize the advertisement image to the entire surface of the document image and the judgment result is outputted.

At the step S25, on the other hand, since it is possible to synthesize the advertisement image to the entire area of the document image, the color of the text is detected for the text area that is judged at the step S23. This text color detection is made based on the image data of each of the RGB colors stored in the memory 65. For example, as it is known that the R, G and B values are approximately equal if the color is black, it is judged black if there is almost no difference between the R, G and B values. Other colors can be similarly judged from the data values of the R, G and B colors.

At the step S26, a color different from the text color detected in the step S25 is specified as the color of the advertisement image. For example, if the text color is a color close to the primary colors such as black, red, green, blue, etc., it is preferable to specify a complementary color such as yellow, cyan, magenta, etc., as the color of the advertisement image in order to avoid the two colors from overlapping each other thus making it difficult to recognize. Moreover, since it is rather unlikely to have any difficulty in recognizing the images by laying a color advertisement image over the text if the text is black, it is acceptable to synthesize a full color advertisement image over a document image of a black text.

At the step S27, an instruction that the advertisement image can be synthesized on the entire area of the document image.

After that, the process goes back to the main flow charts (FIG. 4A and FIG. 4B).

Figure 8:
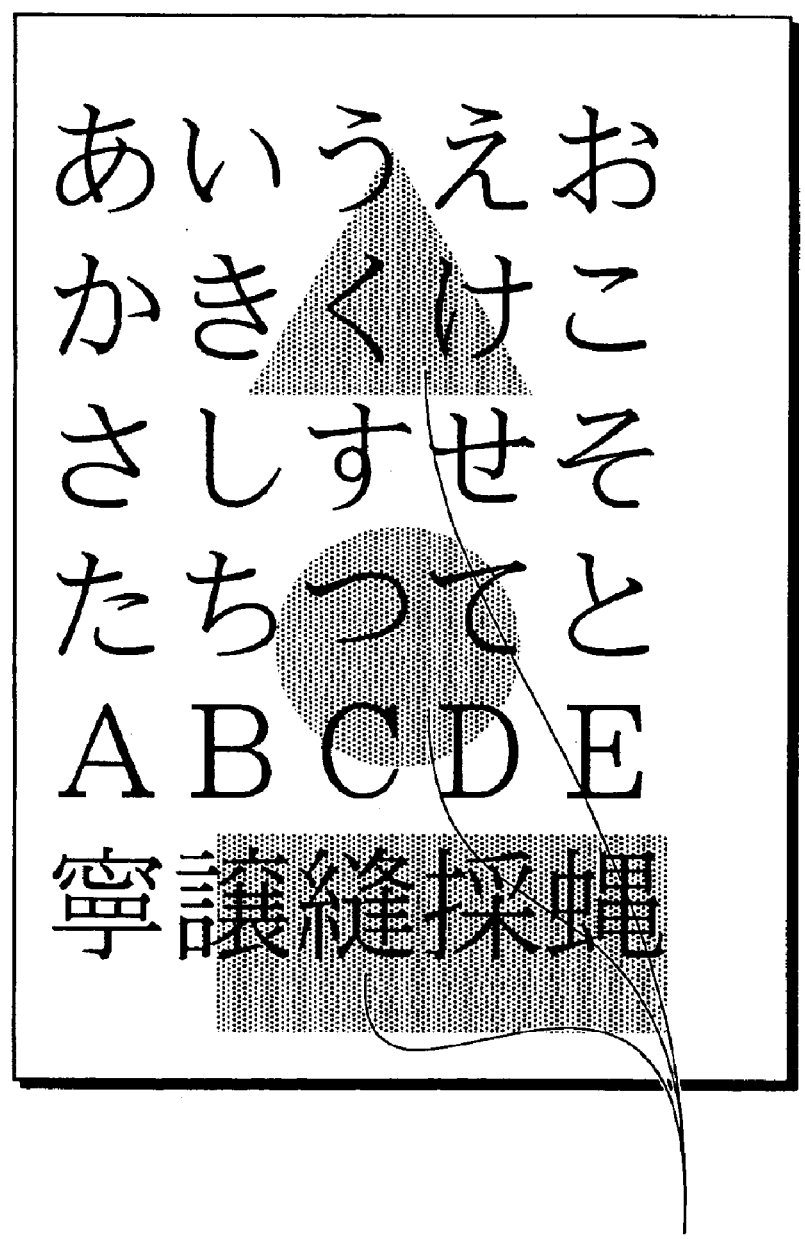
FIG. 8 is a diagram showing an example of a synthesis of an additional image to a document image.

An example of an advertisement image synthesized with a document image is shown in FIG. 8. FIG. 8 shows a case where the entire area of the document image is a text area. As can be seen from FIG. 8, the advertisement image synthesized into the text area has less probability of causing a difficulty in recognizing the document image compared to a case where the advertisement image is synthesized into a photograph or graphic area. In particular, if the advertisement image of a color different from the text color is synthesized, it hardly causes any difficulty in the text recognition. Moreover, the synthesized advertisement image is also almost completely recognizable.

While the features of the invention are described using the above embodiment, it should not be construed that the invention is limited to such an embodiment. For example, although it is described in the above that the advertisement image is synthesized into the entire page of the document image when the entire area of the document image is a text area, it is also possible to synthesize the advertisement image in a text area, which constitutes a portion of the document image.

Figure 9:
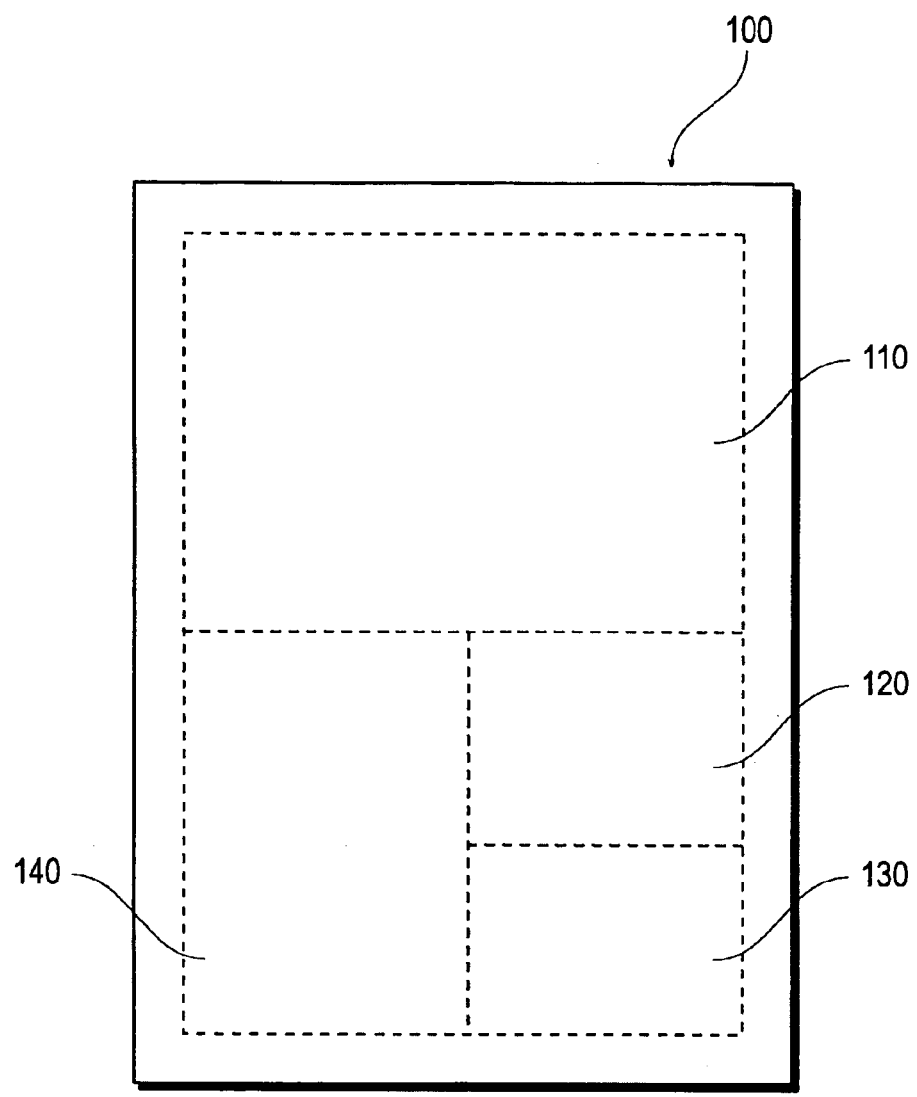
FIG. 9 is a diagram showing a text area and a vacant area included partially in a document image.

FIG. 9 shows a diagram for describing a procedure when a portion of the document image includes a text area.

The document image 100 shown in FIG. 9 includes a text area 110, a photograph area 120, a graphic area 130, and a vacant area 140. The photograph area 120 is an area that contains photograph images and the graphic area 130 is an area that contains graphic images other than photographs. The vacant area 140 is an area without any image data.

The copying machine according to the present invention discriminates the text area 110 from other areas by means of detecting the cyclicity of the density distribution on the document image as mentioned above. With the copying machine according to the present invention, in particular, it is easy to discriminate a text area included in a portion of the document image as it detects the cyclicity of the density distribution along multiple lines. Also, it can detect the size of the text area. An advertisement image that suits the detected text area size can be selected to be synthesized into the text area. Moreover, it is possible to enlarge or reduce the size of the advertisement image in accordance with the size of the text area. According to these procedures, even though the advertisement image cannot be synthesized into the entire area of the document image, it is still possible to have a larger advertisement image compared to a case of synthesizing the advertisement image in a vacant area of the document image, so that a more effective advertisement can be achieved.

Although what was described in the above is a case where a text area is discriminated and an advertisement image is synthesized into the text area, it is also possible to discriminate non-text areas such as vacant areas, photograph areas and graphic areas, and to synthesize an advertisement image in an remaining area except for the non-text areas. In the latter case, the detection of the non-text areas is conducted by detecting the areas with no cyclicity in the density distribution on the document image.

Moreover, it is possible to synthesize an advertisement image in both the text area 110 and the vacant area 140. In this case, it is possible to discriminate the text area 110 by detecting areas with the cyclicity of the density distribution and to discriminate the vacant area 140 by detecting with no change in the density distribution. By synthesizing an advertisement image covering both the text area 110 and the vacant area 140, it is possible to increase the size of an advertisement image that can be synthesized in comparison with a case of synthesizing an advertisement image either in the text area 110 or the vacant area 140.

Further, the discrimination of the text area can be done judging from the number of pixels with densities higher than a specified value rather than a judgment based on the cyclicity of the density distribution as described above. This method is based on a fact that the number of text pixels is approximately 30% of the total pixel count in a normal text area, so that an area can be judged to be a text area if the number of pixels with densities higher than a certain value is more than 30% of the total pixel counts.

Although the above description is based on an assumption that the document image is obtained by scanning the document with the image scanner 21, the invention is not limited to it. It is possible to received both the document image and the advertisement image via a network from a distant location, to synthesize the document image and the advertisement image thus received using the above mentioned method, and to print out the synthesized image on a sheet of paper. The image forming apparatus does not necessarily have to be a copying machine, but rather it can be a printer equipped with an interface for receiving the image.

Moreover, although it was described in the above cases where an advertisement image is synthesized with a document image, it goes without saying that an additional image to be synthesized with a document image does not necessarily have to be an advertisement image, but rather it can be any image with no advertisement purpose.

It is obvious that this invention is not limited to the particular embodiments shown and described above but may be variously changed and modified without departing from the technical concept of this invention.

What is claimed is:

1. Image forming apparatus comprising:

an interface for receiving image data;

a memory for storing the additional images;

a text area discriminating unit for discriminating text areas based on image data received at said interface;

an image synthesizing unit for synthesizing additional images stored in said memory into the text areas discriminated by said text area discriminating unit; and a printer engine for forming the synthesized images synthesized by said image synthesizing unit, wherein the formed synthesized images are visible in the text areas.

2. Image forming apparatus according to the claim 1, wherein said text discriminating unit discriminates text areas based on cyclicities of density distributions of images.

3. Image forming apparatus according to the claim 1, wherein said text discriminating unit discriminates text areas based on a number of pixels having densities higher than a pre determined value.

4. Image forming apparatus according to the claim 1, further comprising a color discriminating unit for discriminating text colors in text areas, wherein said image synthesizing unit synthesizes additional images with colors different from the color discriminated by said color discriminating unit.

5. Image forming apparatus according to the claim 1, further comprising a scanner, wherein said interface receives image data that are obtained by said scanner.

6. Image forming apparatus according to the claim 1, wherein said additional images are used for advertisement.

7. Image forming apparatus comprising:

an interface for receiving image data;

a memory for storing additional images;

an area discriminating unit for discriminating non-text areas based on image data received at said interface;

an image synthesizing unit for synthesizing additional images stored in said memory into areas except for the non-text areas discriminated by said area discriminating unit; and a printer engine for forming the synthesized images synthesized by said image synthesizing unit.

8. Image forming apparatus according to the claim 7, wherein said non-text areas include vacant areas, photograph areas, and graphic areas.

9. Image forming apparatus according to the claim 7, further comprising a scanner, wherein said interface receives image data that are obtained by said scanner.

* * * * *